United States Patent [19]

Müller et al.

[11] Patent Number: 4,984,165

[45] Date of Patent: Jan. 8, 1991

[54] METHOD AND APPARATUS FOR ADAPTING SLIP THRESHOLD VALUES FOR A PROPULSION SLIP AND/OR BRAKING SLIP CONTROL SYSTEM TO THE TIRES OF A MOTOR VEHICLE

[75] Inventors: Armin Müller, Backnang; Hartmut Cordt, Stuttgart, both of Fed. Rep. of Germany

[73] Assignee: Daimler-Benz AG, Fed. Rep. of Germany

[21] Appl. No.: 279,810

[22] Filed: Dec. 5, 1988

[30] Foreign Application Priority Data

Dec. 5, 1987 [DE] Fed. Rep. of Germany ....... 3741247

[51] Int. Cl.⁵ ................................................ B60T 8/32
[52] U.S. Cl. ............................. 364/426.02; 180/197; 303/100; 303/103
[58] Field of Search ...................... 364/426.02, 426.03; 180/197; 303/100, 102, 103, 106

[56] References Cited

U.S. PATENT DOCUMENTS

| | | | |
|---|---|---|---|
| 4,653,816 | 3/1987 | Lin | 364/426.02 |
| 4,715,662 | 12/1987 | van Zanten et al. | 364/426.02 |
| 4,794,538 | 12/1988 | Cao et al. | 364/426.02 |
| 4,862,368 | 8/1989 | Kost et al. | 364/426.02 |

Primary Examiner—Gary Chin
Attorney, Agent, or Firm—Evenson, Wands, Edwards, Lenahan & McKeown

[57] ABSTRACT

Method of and apparatus for adapting slip threshold values for a propulsion slip and/or braking slip control system to the existing tires of a motor vehicle. Here, the instantaneously effective coefficient of friction between vehicle and road is determined from the measured values of the vehicle speed and vehicle longitudinal acceleration from a graph, and with the predetermined value or the predetermined function for the slip thresholds being substituted or corrected by the slip values measured at the driven wheels by use of an operational state defined by a measurement window of a performance graph.

4 Claims, 3 Drawing Sheets

METHOD AND APPARATUS FOR ADAPTING SLIP THRESHOLD VALUES FOR A PROPULSION SLIP AND/OR BRAKING SLIP CONTROL SYSTEM TO THE TIRES OF A MOTOR VEHICLE

BACKGROUND AND SUMMARY OF THE INVENTION

The invention relates to a method and apparatus for adapting slip threshold values for a propulsion slip and/or braking slip control system to the type or condition of the tires of a motor vehicle.

German Offenlegungsschrift No. 3,545,652 discloses a device for controlling torque output in response to slip threshold value signals. In this device, a mean slip threshold is substituted by a lower value, when the vehicle travels faster than a predetermined speed in a curve and the vehicle longitudinal acceleration is within a specific range, for providing a propulsion slip control for the vehicle. Conversely, the means slip threshold is substituted by a higher value when the vehicle likewise travels in a curve and the vehicle longitudinal acceleration is above the above-mentioned range. An adaptation of the slip threshold to the stability required for travelling curves is therefore detectable in a sense when travelling curves. The coefficient of friction, i.e., the grip of the vehicle relative to the nature of the road just being traveled, is left out of consideration, so that a changeover is made to a lower slip threshold value in the case of dry gripping road, for example, although this is not actually necessary if the actual coefficient of friction of the road was considered.

A variation of slip threshold values has been known only in the case cf propulsion slip control systems adaptable to specific driving states and/or to improve traction and/or stability. No attention had been paid to different equipment of the vehicle as regards the tires, although vehicles with both propulsion slip and braking slip control systems react very differently to one and the same road, according to whether they are equipped with summer or winter tires, or with new or worn tires.

Constant slip values which had to be coordinated with the least favorable case, smooth ice, are used predominantly in known control systems. However, these slip thresholds are too low for a higher coefficient of friction, so that only slight accelerations are possible and the propulsion slip control system is switched on with unnecessary frequency. Different sets of tires and the vehicle reactions which they modify are not taken into consideration.

It is therefore the object of the invention to disclose a method which can better predetermine slip thresholds associated with the existing tires of a motor vehicle. This creates optimum control conditions in both propulsion slip and braking slip control systems. It is also the object of the invention to disclose an apparatus for performing this method.

The object of the invention concerns a method of adapting slip threshold values for a propulsion slip and/or braking slip control system to existing tires of a motor vehicle by utilizing a curve of the attainable vehicle acceleration ($a_x$) of a specific vehicle at vehicle standstill ($v_F=0$), as determined from the speeds of the non-driven wheels, determined as a function of the coefficient of friction ($\mu$). This curve is extended into a graph of the coefficient of friction ($\mu$) as a function of vehicle speed ($v_F$) and of vehicle acceleration ($a_x$), taking into consideration the resistances to motion which are a function of vehicle speed ($v_F$). A measurement window associated with a specific coefficient of friction ($\mu_o$) is established in this graph. Then, a basic slip threshold value ($\mu_o$) to be associated with the specific coefficient of friction ($\mu_o$) is substituted by the slip value ($\mu_l$) occurring at the driven wheels, when the motor vehicle attains a driving state defined by the measurement window, with the vehicle travelling straight ahead ($\beta=0$), the driven wheels of the vehicle exhibiting no speed differential ($\Delta vH$), the acceleration ($a_R$) of the driven wheels corresponding to the vehicle acceleration ($a_x$), and when no propulsion slip or braking slip control occurs. The respective slip threshold value ($\lambda_s$) is thus obtained which corresponds to the corrected slip value ($\lambda_l$) associated with the specific coefficient of friction ($\mu_o$).

It is possible by this method to adapt the slip thresholds automatically to the respective tires during travel and thus to create optimum control conditions.

Other objects, advantages and novel features of the present invention will become apparent from the following detailed description of the invention when considered in conjunction with the accompanying drawings.

DETAILED DESCRIPTION OF THE DRAWINGS

Figure 1:
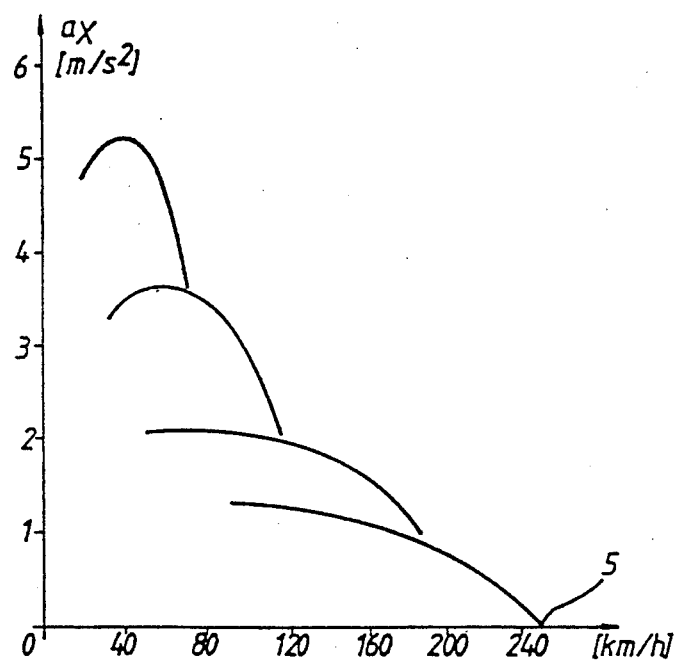
FIG. 1 shows a road performance graph.

FIG. 1 shows a road performance graph for a specific type of motor vehicle which can be determined empirically by experiments, or calculated from known vehicle quantities with specific simplifications using a physical model of a stable rigid two-wheeler. It will be seen from this road performance graph what values of vehicle longitudinal acceleration (plotted on the ordinate) are attainable in the individual gears for a specific vehicle speed (plotted on the abscissa) with the engine under full load.

Using the same physical model of a stable two-wheeler, it is also possible to calculate, for the specific type of motor vehicle, the vehicle longitudinal acceleration attainable from vehicle standstill as a function of the coefficient of friction between vehicle and road. The result of this calculation is the curve 1 shown in FIG. 2. Since it is only valid for the vehicle speed $V_F=0$ km/h, it passes through the origin of the system of coordinates. Resistances to motion therefore do not occur. If the resistances to motion (rolling resistance, air resistance, etc.) are taken into consideration in the calculation, then the curves 2 (marked in FIG. 2) are obtained, which are shown only for some discrete speeds up to the maximum vehicle speed $V_F$max. The increase in the speed is indicated by an arrow. This family of curves is bounded by a dash-line curve 3 which is obtained from the road performance graph in FIG. 1, and indicates the maximum vehicle longitudinal acceleration which is attainable at the respective vehicle speed. It is clear from this that the maximum acceleration is only obtainable from vehicle standstill with the optimum coefficient of friction (point 4) and that no further acceleration is possible at vehicle maximum speed ($V_F$) (point 5). However, the minimum coefficient of friction which is required in order to attain a specific vehicle speed can also be read off from this graph. This value can be read off on the abscissa, where the curve 2 associated with the desired vehicle speed intersects or touches it. The two graphs according to FIGS. 1 and 2 can now be mutually 5 combined to produce a road performance/coefficient of friction graph as shown in FIG. 3.

Figure 2:
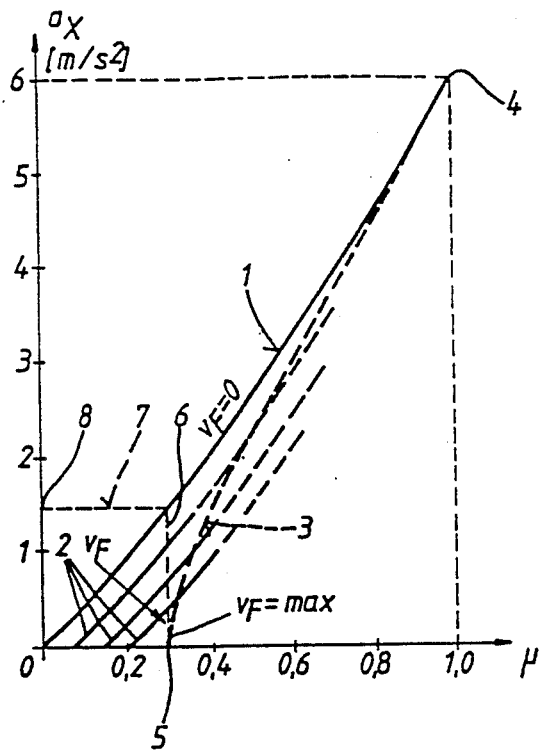
FIG. 2 shows a graph of the attainable vehicle longitudinal acceleration as a function of the coefficient of friction.

Two different points with the same coefficient of friction can be found in FIG. 2, namely, for a specific constant vehicle speed and for the vehicle standstill. For example, at vehicle maximum speed at point 5, the minimum coefficient of friction is approximately $\mu = 0.3$. With this coefficient of friction a maximum vehicle longitudinal acceleration from vehicle standstill of approximately $a_x = 1.4$ m/s² is attainable (lines 6, 7 and point 8). If these two points are transferred into the road performance graph (in FIG. 1) and joined together (FIG. 3) as points 5 and 8 and dash-line 9, then this line 9 approximately gives a curve of constant coefficient of friction or constant grip, and the graph becomes a road performance/coefficient of friction graph. The curves of constant grip are only straight lines when simplified, whereas in actuality they are curved lines 10. They can be determined for the entire graph and are shown in FIG. 3. Thus, a definite coefficient of friction is associated with every point of this graph, the coordinates of which are composed of a specific value of the vehicle speed $V_F$ and a specific value of the vehicle acceleration $a_x$.

Figure 4:
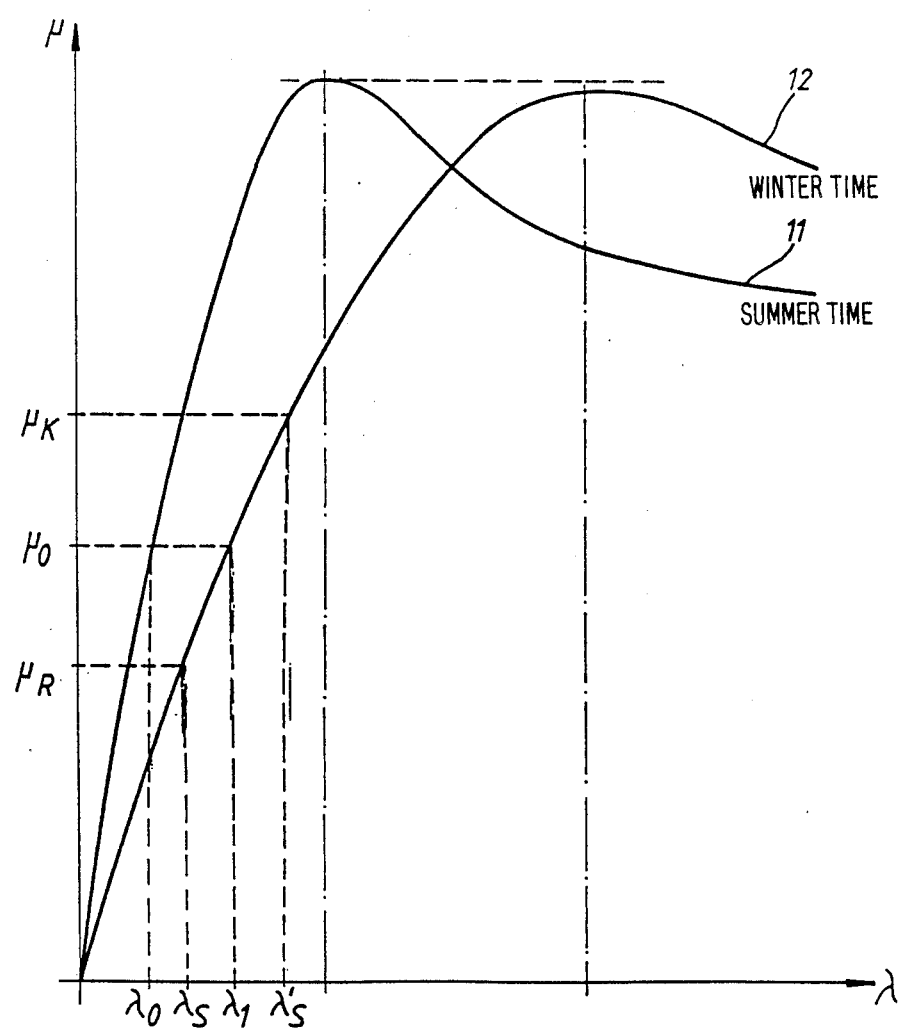
FIG. 4 shows a graph with various coefficient of friction/slip curves.

FIG. 4 shows a graph having two coefficient of friction/slip curves, curve 11 being obtained with a summer tire and curve 12 being obtained with a winter tire on one and the same road. Different slip thresholds $\lambda_o$ and $\lambda_l$ are therefore obtained for a specific coefficient of friction $\mu_o$. For example, if the slip threshold for a propulsion slip control system is $\lambda_o$, and if this is optimally coordinated with the summer tires associated with the curve 11, then it is easy to see that in the case of a tire change to a winter tire corresponding to the curve 12, the control system now starts to control with at slip threshold $\lambda_o$, with a considerably lower coefficient of friction than $\mu_o$, and therefore ceases to operate optimally, because this tire exhibits a considerably greater slip for the same coefficient of friction $\mu_o$.

Figure 3:
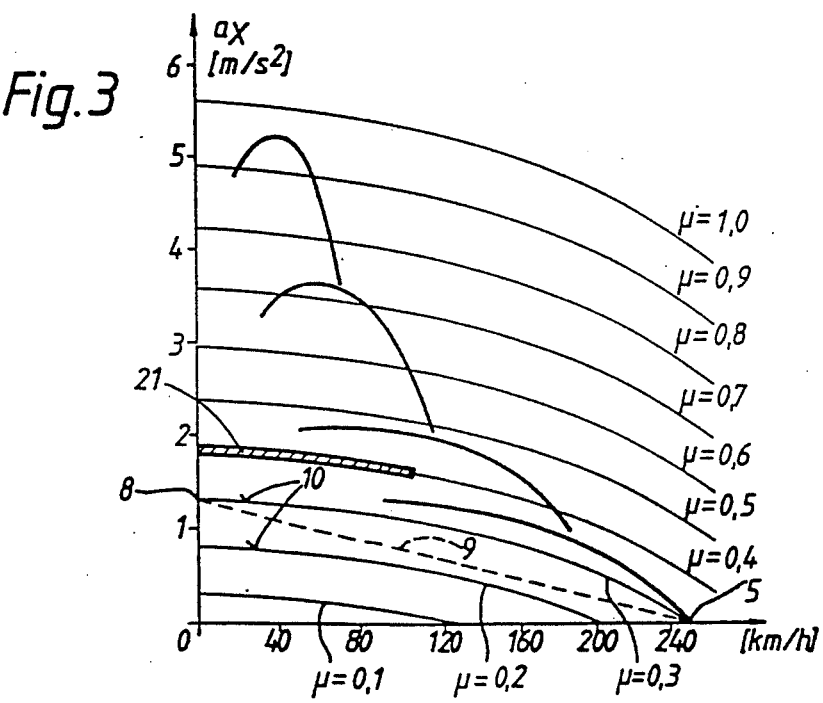
FIG. 3 shows a road performance/coefficient of friction graph prepared from the two graphs according to FIGS. 1 and 2.

For this reason, a narrow measurement window 21 is defined in the road performance/coefficient of friction graph according to FIG. 3. The scale indicated on the graph is determined by $\mu = 0.4$ and a road speed range $V_F < 100$km/h.

Now when the motor vehicle is at an operating point contained in this measurement window 21, $V_F = 50$km/h and $a_x = 1.8$m/s² for example, which corresponds to an instantaneously effective coefficient of friction of $\mu$32 0.4, then if the motor vehicle is in a driving state (defined later), it is possible to measure the slip which occurs at the driven wheels at this operational point. For example, if the predetermined slip threshold value equals $\lambda_o$, and if a slip value $\lambda_l$ is measured at the driven wheels with the tires currently in use at this operational point, then the measured slip value $\lambda_l$ which is associated with the coefficient of friction $\mu_o$ is now established in the coefficient of friction/slip graph.

This slip threshold coordination should be performed only in a "normal" driving state in which no dynamic road parameter variations occur, i.e., when travelling straight ahead (steering angle $\beta = 0$), while the driven wheels exhibit no speed differential $\Delta v_H$ due to different coefficients of friction (homogenous road), while the acceleration of the driven wheels corresponds to the vehicle acceleration $a_x$ (no propulsion torque excess), and while no propulsion slip or braking slip control action is occurring.

With the new slip value $\lambda_l$ thus determined as associated with the coefficient of friction $\mu_o$, it is now possible for an anti-locking system to determine a slip threshold value $\lambda_s$ associated with a coefficient of friction of $\mu_R = 0.15$, and to find this easily from a predetermined function $\lambda = f(\mu)$. If this function is linear, for example, then $$\lambda_s = \lambda_l \mu_R / \mu_0$$

This value is approximately constant so long as the tire characteristics remain the same. If the tires become worn or are substituted by others, then the slip threshold $\lambda_s$ also varies.

In a propulsion slip control system, other slip thresholds are proper and can also be adapted for specific road conditions instantaneously, or periodically at intervals in the millisecond range by this method. This is done by determining an instantaneous coefficient of friction $\mu_k$ from the graph of FIG. 3 according to the input quantities of vehicle speed $V_F$ and vehicle longitudinal acceleration $a_x$, and calculating slip threshold value $\lambda'_s$ associated with the latter according to a predetermined function $\lambda = f(\mu)$, which is likewise linear, for example, from $$pl \; \lambda'_s = \lambda_l \mu_K / \mu_0$$

Braking slip and/or propulsion slip control systems operate with these slip threshold values $\lambda_s$ and/or $\lambda'_s$ according to their particular program in a manner known per se.

Figure 5:
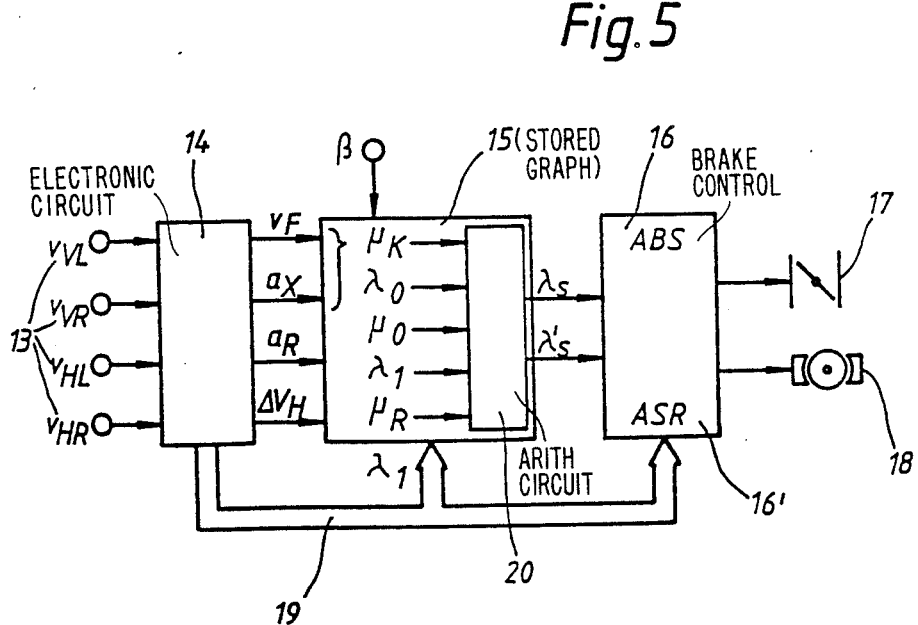
FIG. 5 shows a diagrammatic exemplary embodiment of an apparatus for performing the method according to the invention.

A diagrammatic exemplary embodiment of an apparatus for performing the method according to the invention is illustrated in FIG. 5. The numeral 13 designates speed sensors for each of four vehicle wheels which output signals associated with the wheel speeds and/or wheel circumferential speeds $v_{VL}$, $v_{VR}$, $v_{HL}$, $v_{HR}$, corresponding to left and right front and rear wheels, to an electronic circuit 14 which calculates from them the vehicle speed $v_F$, the vehicle longitudinal acceleration $a_x$ as well as speed differential, $V_H$, acceleration $a_r$ and the slip values $\lambda_R$, $\lambda_L$ of the driven wheels.

The numeral 15 designates a stored graph to which the vehicle speed $v_F$ and the vehicle longitudinal acceleration $a_x$ are fed as input quantities, and which outputs a coefficient of friction $\mu_k$ associated with these input quantities.

If the conditions
(a) steering angle $\beta = 0$,
(b) no speed differential $\Delta V_H$ of the driven wheels,
(c) acceleration $a_r$ corresponds to vehicle acceleration $a_x$, and
(d) no PSC or BSC control action are fulfilled and an operational state established by a measurement window defined in the graph 10 is attained, then the slip $\lambda_I$ measured instantaneously at the driven wheels is detected and replaces the permanently predetermined slip value $\lambda_o$ which is stored together with the above defined quantities $\mu_o$ and $\mu_R$ as shown in FIG. 4.

In an arithmetic circuit 20 a slip threshold value $\lambda_s$ for the braking slip control system 16 and/or a fixed or variable slip threshold value $\lambda'_s$ for the propulsion slip control system 16' is determined according to the formulae given above and fed to the control systems 16 or 16' together with the other required quantities (slip of driven wheels, accelerations etc.) which are passed to the control systems 16, 16' by lines 19, which according to their programs influence the propulsion, indicated by a fuel throttle flap 17, or the brakes 18 of the driven and non-driven wheels of the vehicle in a known manner.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Method of adapting slip threshold values for at least one of a propulsion slip and braking slip control system to existing tires of a motor vehicle, comprising the following steps:
   determining a curve of an attainable vehicle acceleration ($a_x$) of a specific vehicle from vehicle standstill ($v_F=0$), said attainable vehicle acceleration being determined from speeds of non-driven wheels of the vehicle and a function of a coefficient of friction ($\mu$) between driven wheels of the vehicle and a roadway;
   converting said curve into a graph by plotting the coefficient of friction ($\mu$) as a function of vehicle speed ($v_f$) and said vehicle acceleration ($a_x$);
   defining a measurement window in the graph that is associated with a specific coefficient of friction ($\mu_o$) on said graph by taking into consideration the resistances to motion which are a function of said vehicle speed ($v_F$) as well as the type of vehicle tire being used;
   substituting an actual slip value ($\lambda_l$) occurring at the driven wheels for a basic slip threshold value ($\lambda_o$), said basic slip threshold value ($\lambda_o$) being associated with the specific coefficient of friction ($\mu_o$), during a time period when the motor vehicle has a vehicle speed and a vehicle acceleration within the measurement window, with the vehicle travelling straight ahead ($\beta=0$), with the driven wheel of the vehicle exhibiting no speed differential ($\Delta$VH), with the accelerations ($a_R$) of the driven wheels corresponding to the vehicle acceleration ($a_x$), and when no propulsion slip or braking slip control occurs;
   and calculating a respective slip threshold value ($\lambda_s$) associated with a second coefficient of friction ($\mu_R$) different from the specific coefficient of friction ($\mu_o$), said respective slip threshold value being related to said actual slip value as a function of the specific coefficient of friction ($\mu_o$) and the second coefficient of friction ($\mu_R$).

2. Method according to claim 1, wherein the respective slip threshold value ($\lambda_s$) is determined by the ration ($\lambda_s=\lambda_l\cdot\lambda_R/\lambda_o$) and the second coefficient of friction $\lambda_R$ is the coefficient of friction for which the braking slip control system is designed.

3. Method according to claim 1, wherein other respective slip threshold value ($\lambda'_s$) can be calculated continuously by the ratio [($\lambda'_s=\lambda l\cdot\mu_k/\mu_o$, $\mu_k$)] ($\lambda'_s=\lambda_l\cdot\mu_k/\mu_o$) from the graph where $\mu_k$ is a value of an instantaneous coefficient of friction.

4. Apparatus for adapting slip threshold values for at least one of a propulsion slip and braking slip control system to existing wheels of a motor vehicle, comprising:
   sensor means for measuring the circumferential speeds of the vehicle wheels;
   means for determining the required operational parameters to create the curves and graphs from output signals created by the sensor means;
   means for producing output signals responsive to a predeterminable slip value for at least one of a non-driven and a driven vehicle wheel;
   means for determining signals of vehicle speed (vf) and vehicle longitudinal acceleration ($a_x$) from the output signals of the sensor means and for creating a coefficient of friction ($\mu_k$) value associated with the vehicle speed and vehicle longitudinal acceleration which are parameters used to create the graphs, said means for determining and creating including means for substituting for the predetermined slip value ($\lambda_o$) an actual slip value ($\lambda_l$) measured at the driven wheels of the vehicle when the motor vehicle is in an operational state defined by a measurement window associated with the said coefficient of friction within the graphs, and the conditions of the vehicle show:
   (a) the vehicle is travelling straight ahead;
   (b) no speed differential of the driven wheels of the vehicle exists;
   (c) any acceleration of the driven wheels is equal to the vehicle longitudinal acceleration; and
   (d) no propulsion slip or braking slip control operation being simultaneously undertaken;
   an arithmetic circuit means, coupled to the means for determining and creating, for converting the predetermined slip value ($\lambda_o$) by predetermined coefficients of friction and of a predetermined function ($\lambda=f(\mu)$) to corresponding slip threshold values ($\lambda_s$; $\lambda'_s$) and to utilize the created corresponding slip threshold values as inputs to at least one of said braking slip control system and propulsion slip control system, by which said created corresponding slip threshold values are further processed into control signals for controlling at least one of the propulsion system and the brakes of the vehicle.

* * * * *